(12) United States Patent
Xuan et al.

(10) Patent No.: US 11,657,170 B2
(45) Date of Patent: May 23, 2023

(54) SECURE CROSS-DEVICE DIRECT TRANSIENT DATA SHARING

(71) Applicant: VMware, Inc., Palo Alto, CA (US)

(72) Inventors: Chaoting Xuan, Duluth, GA (US); Lin Lv, Beijing (CN); Suyu Pan, Atlanta, GA (US); Guoxin Liu, Beijing (CN); Qimin Yao, Atlanta, GA (US); Yue Zhao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 438 days.

(21) Appl. No.: 15/930,284

(22) Filed: May 12, 2020

(65) Prior Publication Data

US 2021/0216656 A1 Jul. 15, 2021

(30) Foreign Application Priority Data

Jan. 15, 2020 (CN) .................. PCT/CN2020/072198

(51) Int. Cl.
*G06F 21/62* (2013.01)
*G06F 16/23* (2019.01)
*G06F 16/25* (2019.01)
*G06F 21/44* (2013.01)

(52) U.S. Cl.
CPC ...... *G06F 21/6218* (2013.01); *G06F 16/2365* (2019.01); *G06F 16/258* (2019.01); *G06F 21/44* (2013.01)

(58) Field of Classification Search
None
See application file for complete search history.

(56) References Cited

U.S. PATENT DOCUMENTS

| 8,473,587 | B1* | 6/2013 | Lappas | G06F 9/45558 |
| | | | | 718/1 |
| 11,416,342 | B2* | 8/2022 | Zlotnick | G06F 9/4416 |
| 2017/0371693 | A1* | 12/2017 | Corrie | G06F 16/188 |

OTHER PUBLICATIONS

Liu (Zheng Liu, "Microsoft. NET Passport, a solution of single sign on", Department o Computer Science University of Auckland, Feb. 2018) (Year: 2018).*
Boettcher (Boetthcher et al., "Unleash the Power of Single Sign-on with Microsoft and SAP", Collaboration Technology Support Center—Microsoft, Collaboration Brief, Sep. 2007) (Year: 2007).*
Hadfield (Hadfield et al. "Server 4 Security Handbook", ISBN 078971213x, 1997) (Year: 1997).*

* cited by examiner

*Primary Examiner* — Piotr Poltorak
(74) *Attorney, Agent, or Firm* — Clayton, McKay & Bailey, PC

(57) ABSTRACT

Systems and methods can allow for secure cross-device sharing of transient data using direct transient data sharing ("DTDS"). A source destination can share data using local DTDS with an agent on a first device. The agent can send the data to a hub server that runs a security control process and data formatting process. The hub server can determine risk scores for the source and destination devices and allow the sharing to occur if a safety threshold is met. Then an agent on the destination device can receive the transient data and use local DTDS to send the data to a destination application.

18 Claims, 4 Drawing Sheets

SECURE CROSS-DEVICE DIRECT TRANSIENT DATA SHARING

CROSS REFERENCE TO RELATED APPLICATION

This patent application claims priority to PCT Application no. PCT/CN2020/072198 ("SECURE CROSS-DEVICE DIRECT TRANSIENT DATA SHARING"), filed in China on Jan. 15, 2020, which is hereby incorporated by reference in its entirety.

BACKGROUND

Most major operating system ("OS") types support sharing transient data between applications using direct transient data sharing ("DTDS"). Transient data, as opposed to traditional files, can include items that appear on screen. Currently, a user can use DTDS to share this type of data between two applications on a single user device. For example, a user can select to share an image, location, or interesting article and share that data with another application, such as a text application. This can allow a user to send an article via text, for example, by sending a link to the article from a browser to a texting application. Shared transient data often includes texts, uniform resource locators ("URLs"), or images, which can be located in the memory or local cache of a running application. Although current DTDS solutions allow two applications on the same device to share this sort of information, there is no DTDS solution that allows for similarly sharing transient data between two applications on different devices. In fact, no easy methodology exists for sharing transient data between applications on different user devices without exposing the devices or data to security risk.

Traditional copy-and-paste technology suffers differences from DTDS that make it undesirable for cross-device sharing. First, there are security differences. With copy-and-paste, target data is first copied to a clipboard before being pasted to a destination application. The clipboard is accessible by multiple applications on a device, including applications that may not be trustworthy. DTDS, on the other hand, transfers target data from a source application to a destination application using an inter process communication ("IPC") mechanism. Third-party applications cannot access the data. Second, DTDS supports more types of data than traditional copy-and-paste. Third, DTDS can transfer larger data sizes than copy-and-paste on most operating system ("OS") platforms. For example, copy-and-paste may be limited to tags or links to data rather than the underlying data itself.

Users and enterprises need a way to share data between applications on different devices that belong to a same user. Doing so could create a seamless user experience between different devices associated with the user. But the approach needs to be secure such that the data cannot be intercepted by third-party applications. Additionally, multiple data types of various data sizes need to be shared between the applications on the user's different devices, even when those devices run a different OS from one another.

As a result, a need exists for systems and methods for sharing transient data using secure cross-device DTDS.

SUMMARY

Examples described herein include systems and methods for sharing transient data between multiple devices associated with a user, using DTDS. An example method can allow applications to synchronize data between different devices of a user, such as a laptop and a mobile phone. When a user generates data in a source application on a first device, the data can be shared with a destination application on a second device. The source and destination applications can be the same or different than one another. For example, the source application can operate on a first OS, whereas the destination application can be a different version of the source application and operate on a different second OS. Alternatively, the source and destination applications can be completely different, such as a map application and a text application.

To share between a user's devices, a hub service can track which devices are associated with which users. The devices, which can be any processor-enabled devices, can run local agents that communicate with a server of the hub service. These agents can be hub applications or can be part of the OS on the device. On the first device (also called the source device), a source application can use local DTDS to share transient data with the agent. The sharing with the agent can occur automatically, in an example. The agent can encrypt the data and send it to the hub server.

The hub server can receive the data from the first device and identify a second device (also called a destination device) associated with the same user as the first device. In one example, the destination device is automatically selected based on any user device that is available for transient data synchronization or sharing. Alternatively, the user can make a selection on the source device to indicate which other device or devices the user wishes to share with.

Prior to sharing the data from the first device with the second device, the hub server can determine whether security policy requirements are met. This can include determining at least one risk score for sending the data to the second device. In one example, both the first and second devices are scored based on whether those devices comply with security policies. Compliance status can be reported to the hub server by agents that run on the devices. The compliance requirements can be set by an administrator, such as an administrator of an enterprise mobility management ("EMM") system. The compliance requirements can be based on, for example, management status in the EMM system, encryption settings, jailbroken status, the presence of blacklisted applications, and others. In one example, a risk score can be based on the compliance status of both devices. If the risk scores meet threshold safety levels, the hub server can send the data to a destination application of the second device. This can include sending the data to an agent on the second device. The agent can decrypt the data and use DTDS to share the data with the destination application on the second device.

Prior to sending the data to the second device, the hub server can also convert the data into a format that is compatible for DTDS at the destination device, in an example. Different OS platforms can have different share contracts that specify how the OS allows sharing data between applications on the device. The share contracts of different OS versions or types can differ with regard to permissible transient data types and sizes allowed for use with DTDS. As a result, different OS platforms can dictate converting the data format when sharing the data with the second device. For example, an image may need to be converted from a .JPG format to a .BMP format prior to being shared with the agent of the second device when the second device is running WINDOWS. This can allow the agent to use DTDS to share the .BMP with the destination application on the second device. The conversion can be based on incompatibility with the destination share contract or based on an advantageous data type for the destination OS.

The share contracts for DTDS can also differ with regard to communication specifications, such as whether single or multiple communications are sent and the maximum size of those communications. The data conversion at the hub server can take these differences into account, such as by breaking a data object into multiple parts or manipulating transient data size.

The hub server can track which user devices run which OS versions. To do this, the agent on each device can report OS version information to the hub server in an example. The OS version information can be retrieved as part of determining whether security requirements (e.g., risk scores) are met or for determining whether data conversion is needed.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1:
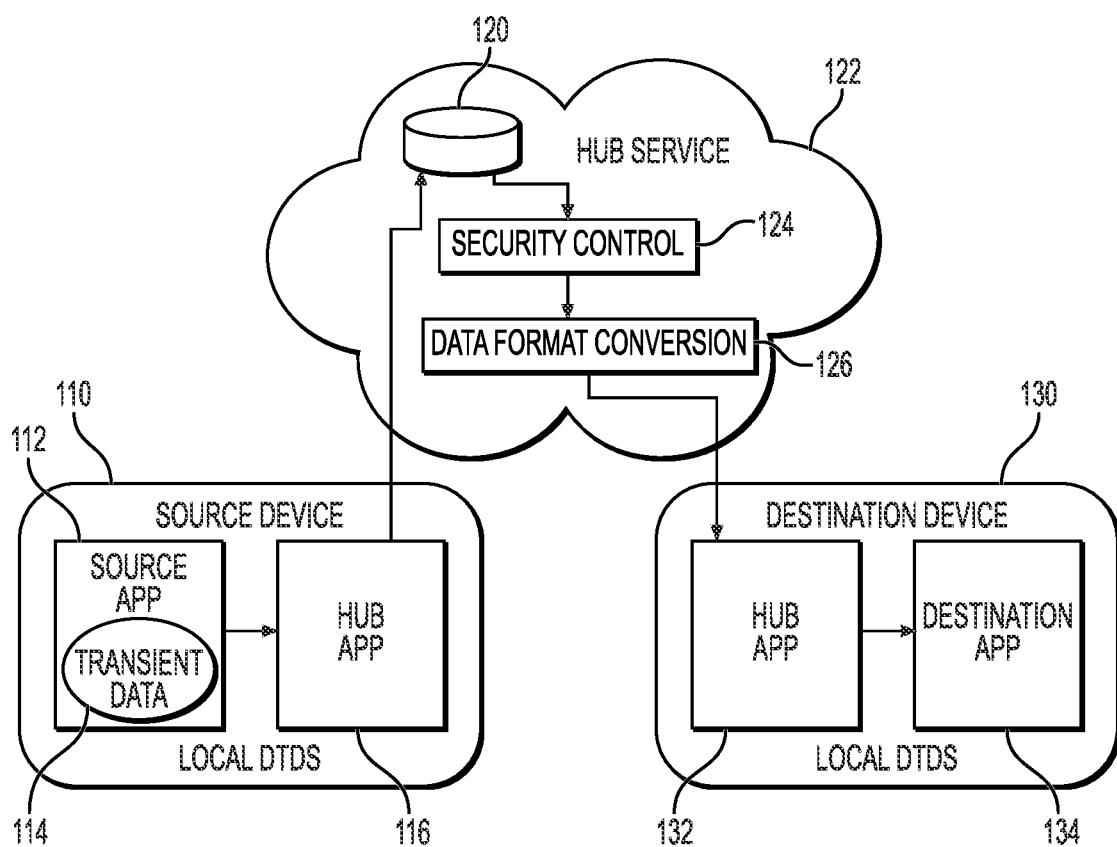
FIG. 1 is an example diagram of system components for secure cross-device DTDS.

Reference will now be made in detail to the present examples, including examples illustrated in the accompanying drawings. Wherever possible, the same reference numbers will be used throughout the drawings to refer to the same or like parts.

In an example, a hub service utilizes local DTDS on multiple user devices to share data between those devices. A hub server located remotely from the user devices, such as in the cloud, can communicate with agents on the user devices. In one example, the agents are hub applications, installed on the user devices as part of the hub service. The hub service can be part of an EMM system, allowing for the management of some applications on the user device. Applications that operate with the hub service can automatically share data with the agent. The data can include content created or received by the user at a first user device. The agent on the first user device can receive the data and send the data to the hub server. The data can be encrypted by the agent, in an example.

The hub server can identify other user devices, including a second user device, that are associated with the same user as the first user device. In one example, user profiles are stored at the user device that track which user devices are enrolled with the hub service or EMM system. Additionally, the hub server can track which of those devices should be kept synchronized. When the second user device is one of those devices, the hub server can determine whether it would be secure to send the data to the second device. Additionally, the hub server can covert the data to a format that is compatible with a share contract for the second device. The OS of the second device can determine the applicable share contract, which can govern which data types are compatible with DTDS at the second device. The conversion can also account for communication specifications of the share contract at the second device.

The data can be converted and sent to a destination application at the second device. The destination application can be the same or different than the source application. For example, the destination application can be a different version of the source application that operates with a different OS than the source application. Alternatively, the destination application can be a totally different application, such as a text application, compared to the first application, which can be a content viewer that includes a data sharing option. To send the data to the destination application, the data can be sent to an agent on the second device. Again, this agent can be an installed hub application or a part of the OS of the second device. The agent on the second device can decrypt the data and use local DTDS to share the data with the destination application.

Using this approach, third party applications cannot access the data while it is being shared from the source application to the destination application. The local DTDS keeps the data secure locally between source or destination applications and the agent. The agent and hub server can use encryption to keep the data secure when transmitted to and from the hub server. This can allow applications to share transient data across multiple devices without exposing security risks typically associated with copy-and-paste or other synchronization actions.

FIG. 1 is an example diagram of system components for secure cross-device DTDS. A first device 110 and a second device 130 can each communicate with a hub server 120 over a network, such as the internet. The first and second devices 110, 130 can be user devices associated with a user. Example user devices can include any processor-enabled device, such as a phone, tablet, laptop computer, or personal computer. In this example, the first device 110 can be a source of data that is shared with the second device 130, which can be a data destination. The hub server 120 can manage the data sharing and act as middle point between the devices 110, 130 for security and format conversion purposes.

The hub server 120 can include one or more physical or virtual servers. The hub server 120 can be one or more physical or virtual components that execute a hub service in the cloud 122, in an example. Therefore, it can operate remotely with respect to the first and second devices 110, 130.

The first device 110 can include a source application 112 and a hub application 116, in an example. The hub application 116 can be one type of agent that executes on the first device 110 and communicates with the hub server 120. Alternatively, the agent can be part of the device's 110 OS in an example. Some OS platforms include EMM functionality that serves as the agent. The agent can interact with applications on the device, such as the source application 112 or destination application 134. Although the example of FIG. 1 illustrates a hub application 116, 132, the examples can also apply to other types of agents. In an example, the agent can provide additional management functionality beyond data synchronization and communications with the hub server 120 of the hub service. For example, in an EMM system, the agent can also ensure that the device 110, 130 remains compliant with a security policy by limiting device functionality when particular managed applications are used, or enterprise data is accessed. The hub service or some other EMM service can send a security policy to the agent for enforcement locally at the user device 110. For example, a security policy may cause the agent to disable printing and disable screen shot functionality while a managed application is maximized and in use.

The hub application 116 can be installed as part of device enrollment in the hub service or an EMM system. The hub service itself can be part of the EMM system. For example, the hub service can control which applications can share data with one another across devices. The hub server 120 can base sharing decisions on which devices are compliant with management policies set forth in the EMM system. Management policies can help ensure that enterprise data does not become accessible by unmanaged third-party applications in an example.

The hub service can include multiple managed applications. The managed applications available at the devices 110, 130 can be based on user profiles. For example, the user can be associated with a group within the enterprise, such as an executive group or a programmer group. Different groups can have different managed applications that are accessible as part of the hub service. For example, the programmer group can be assigned a managed coding platform and the executive group can be assigned a task management application. These managed applications can access enterprise data and be preconfigured to operate with the agent. For example, the agent can check to ensure that the device 110, 130 is compliant with a security policy before allowing access to or enabling functionality in the managed applications.

The managed applications can also be preconfigured to share certain types of transient data with the agent using DTDS. The data types can be selected in a management console in one example. The data types can also depend on the share contract of the particular OS that the device 110, 130 is running. The first device 110 and second device 130 can include the same or different OS versions. For example, the first device 110 can be a laptop that operates a WINDOWS OS while the second device 130 can be a phone or tablet that operates the iOS OS.

In one example, a source application 112 can detect transient data 114 to share with a destination application 134 on a different user device 130. The source application 112 can be a managed application that is provided as part of the hub service, in an example. The hub server 120 can inform the agent, such as hub application 116, that additional user devices exist for data sharing purposes. The agent can then request that the source application 112 send certain types of transient data 114 to the agent using local DTDS. When an eligible data type exists within the source application 112, the source application can send the data 114 to the hub application 116 using DTDS. Alternatively, the source application 112 can include a selectable option for the user to share or synchronize data 114 with the user's other enrolled devices 130. This can include sharing a link, image, or text. If the user selects the option, then the source application 112 can share the data 114 with the hub application 116 (or other type of agent) using DTDS. This can prevent detection from a third-party application.

After the agent (such as hub application 116) receives the data 114 through DTDS, the agent can send the data 114 to the hub server 120. In one example, the agent encrypts the data using a key or hash that is known to the hub server 120. The agent can then send the encrypted data 114 to the hub server 120, again preventing detection from a third-party application.

The hub service can include a security control process 124 that executes on the hub server 120 or elsewhere in the cloud 122. The security control process 124 can determine if one or both of the devices 110, 130 meet security requirements. In one example, the hub service can apply a zero trust framework to ensure that the data should be shared from the first device 110 to the second device 130. Zero trust framework can include calculating risk scores that are compared against thresholds. The risk scores can be based on device security, application security, and data security. Zero trust can also include validating a user session based on multi-factor authentication and other technologies. Risk scores can be calculated for the devices 110, 130, applications 116, 132, data 114, or user. These risk scores can be used by the hub server 120 to determine whether to share the data 114 between the source application 112 and destination application 134.

The security requirements can relate to whether the user devices 110, 130 or applications 112, 134 are in an insecure state. The security control process 124 can attempt to discover an insecure device or application state prior to sending the data 114 to the second device 130, in an example. This can prevent an insecure device 130 or insecure destination application 134 from receiving potentially sensitive data 114. Additionally, the security control process 124 can prevent data 114 from being sent to the second device 130 when the source application 112 or first device 110 is deemed insecure. In one example, the hub applications 116, 132 can determine and report the compliance status of both devices 110, 120 to the hub server 120 or some other server.

The compliance status can factor into a risk score for a device 110, 130. A security policy can be created that enables or disables transferring transient data 114 based on threshold risk values for the source and destination devices 110, 120. If both devices 110, 130 have risk scores that meet safety thresholds, the transient data 114 can be transferred between the devices 110, 130. Additionally, an administrator of the hub service can create a security policy that considers the source application 112 and destination application 134 in deciding whether to transfer data 114. The security policy can allow or disallow transferring transient data 114 between managed and unmanaged applications across devices 110, 130, in an example. The hub server 120 can look up the management status of an application 112, 134 in an example based on stored records about different application identifiers. Alternatively, the hub server 120 can rely on the hub application 116, 132 to check and report the management status of the application 112, 134.

In one example, risk scores are used to check both devices 110, 130 and applications 112, 134 prior to the hub server 120 authorizing the data transfer. Data 114 can also be scored for risk assessment purposes. For example, when the data 114 includes a URL or executable code, the URL or code can be checked against blacklisted items prior to transmission. This can prevent sharing potentially harmful material between devices.

In addition to a security control process 124, the hub service can also execute a data format conversion process 126, in an example. The format conversion process 126 can execute on the hub server 120 or elsewhere in the cloud 122. The format conversion can include share-contract adaptation in an example. Different OS platforms can follow different share contracts. When the OS of the second device 130 is different than that of the first device 110, the hub service can perform content-specification adaptation and communication-specification adaptation. Content-specification adaptation can include changing the data 114 format to a format that is recognized by the share contract of the second device 130. The format chosen for translation can be based on an available application programming interface ("API") for the OS of the second device 130 (which executes the destination application 134). Communication specification adaptation can include changing the format of data transfer. For example, the OS of the destination can require asynchronous DTDS transfer where large amounts of data are broken into smaller blocks. Additionally, the OS may have rules regarding serial versus parallel DTDS of multiple different transient data objects.

In one example, the hub server 120 can decrypt the data 114 using a private key or hash value. Then the transient data 114 can be subjected to the data format conversion process 126. The transient data can be re-encrypted and sent to the hub application 132 (or another agent) of the second device 130. The hub application 132 can decrypt the data 114 using a shared key in an example. Then, using DTDS, the data 114 can be shared locally from the hub application 132 to the destination application 134. In this way, the source application 112 can share data 114 with the destination application 134 on a separate user device 130 without exposing the data 114 to third parties. Additionally, the sharing can be managed by the hub service, which can ensure that security concerns are minimized while formatting the data 114 for sharing on a different user device that can have a different OS.

Figure 2:
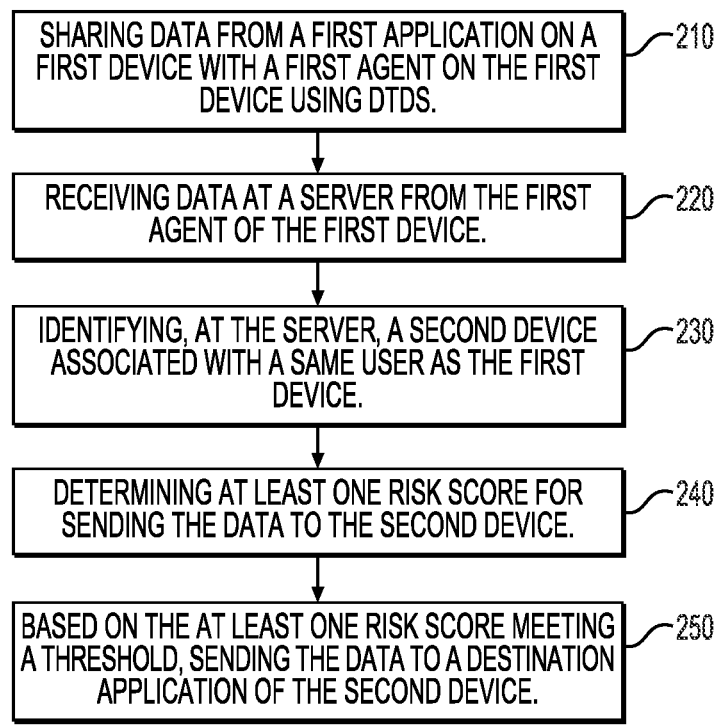
FIG. 2 is a flowchart of an example method for secure cross-device DTDS.

FIG. 2 is a flowchart of an example method for secure cross-device DTDS. The example stages can be performed by a hub server, in an example, based on interactions with agents on user devices. At stage 210, a source application 112 on the first device 110 can use DTDS to automatically share data 114 with a first agent (such as hub application 116) on the first device 110. The DTDS can be local and operate according to a share contract of the OS on the first device 110. The share contract can define which types of data are sharable using DTDS for that OS. Also, the share contract can specify event handlers and functions for use with DTDS for that OS. The OS can have built in functionality for sharing between local applications without exposing the shared data to third-party applications. This can allow the source application 112 to securely pass the data 114 to the first agent. In another example, a software development kit ("SDK") can be used to add cross-device DTDS sharing functionality to an application. For example, the SDK can add functionality to alert the agent regarding certain types of data that can be shared with the agent using DTDS.

At stage 220, the first agent can share the data 114 from the first user device 110 to a server 120. The server 120 can be part of a hub service in an example. The first agent can encrypt the data 114 using a shared secret with the server 120. This can allow the data 114 to be securely transferred over a network, such as the internet. The first agent can be installed or activated as part of an EMM system in an example. The agent can be preset to know the location and manner of contacting the server 120, in an example. In another example, the agent can authenticate the user device 110 or user with an identity server in order to receive credentials for contacting the server 120.

At stage 230, the server 120 can identify a second device associated with a same user as the first device. To do this in one example, the server 120 can use a device identifier of the first device 110 to look up a user identifier. Then the server 120 can look up other devices associated with that user identifier. The user-to-device relationships can be stored in a database. The database can be accessed by the server 120 or some other process, depending on the example.

The other devices associated with the user can include a second device 130, which can be the same or different device type as the first device 110. The second device 130 can run the same or different OS as the first device 110. The server 120 can identify whether a data format conversion is needed based on the difference OS between the devices 110, 130, in an example. This can be performed before or after the security control, depending on the example.

At stage 240, the server 120 or an agent can determine at least one risk score for sending the data 114 to the second device 130. The risk score can be determined by receiving information about the devices 110, 130 and calculating risk based on device context and user behavior. The risk score can be more than one risk score in an example, such as separate scores for the sending device 110, receiving device 130, source application 112, and destination application 134. In one example, the scores are based on device compliance according to compliance policies of the EMM system, which can be defined by an administrator. The agents on the devices 110, 130 can report to the server 120 regarding the compliance level of the devices 110, 130. The risk scores can also be based on multiple attributes, such as which applications are installed and running on the device. These attributes can be part of a risk model in an example. The model can output a score based on the current use of the device 110, 130, in an example. Other factors can include whether both devices are currently logged in at the same location, which can decrease risk, or both logged in at different locations, which can increase risk.

The data 114 can also be converted prior to sending. The conversion can be based on share contract adaptation, including content- and communication-based transformations. In one example, the OS of each device 110, 130 can be different. The server 120 can track which OS type and version each device 110, 130 is operating as part of enrollment with the hub system, in an example. The agent can report this information to the server 112 in an example. To convert the data 114, the server can utilize APIs for both of the OS platforms, in an example. The server can determine the format received and map the data in that format to the format required at the second device 130. Then the server 112 can perform conversions. If no conversion is possible from the first share contract to the second, then the server 112 can decline to send the data 114 in an example.

At stage 250, in an instance in which a risk score meets a safety threshold, the server 120 can send the data to a destination application 134 of the second device 130. The safety threshold required can be defined as part of a risk profile for the hub service. In one example, both devices 110, 130 must meet a safety threshold. In another example, only the receiving device 130 needs to meet the threshold. The policy can prevent transferring data from a relatively safe device to a risky device, in an example. In that example, the threshold can represent a difference between the two risk scores.

If the safety threshold is met, the server 120 can send the data 114 to the second device 130. To send the data 114 to the destination application 134, the server 120 can send the data 114 to the agent (e.g., hub application 132) in an example. The data 114 can be encrypted at the server 120 and decrypted by the agent on the second device 130, in an example. Then the agent can use DTDS to transfer the data 114 to the destination application. The DTDS can be according to the share contract of the OS on the second device 130.

Figure 3:
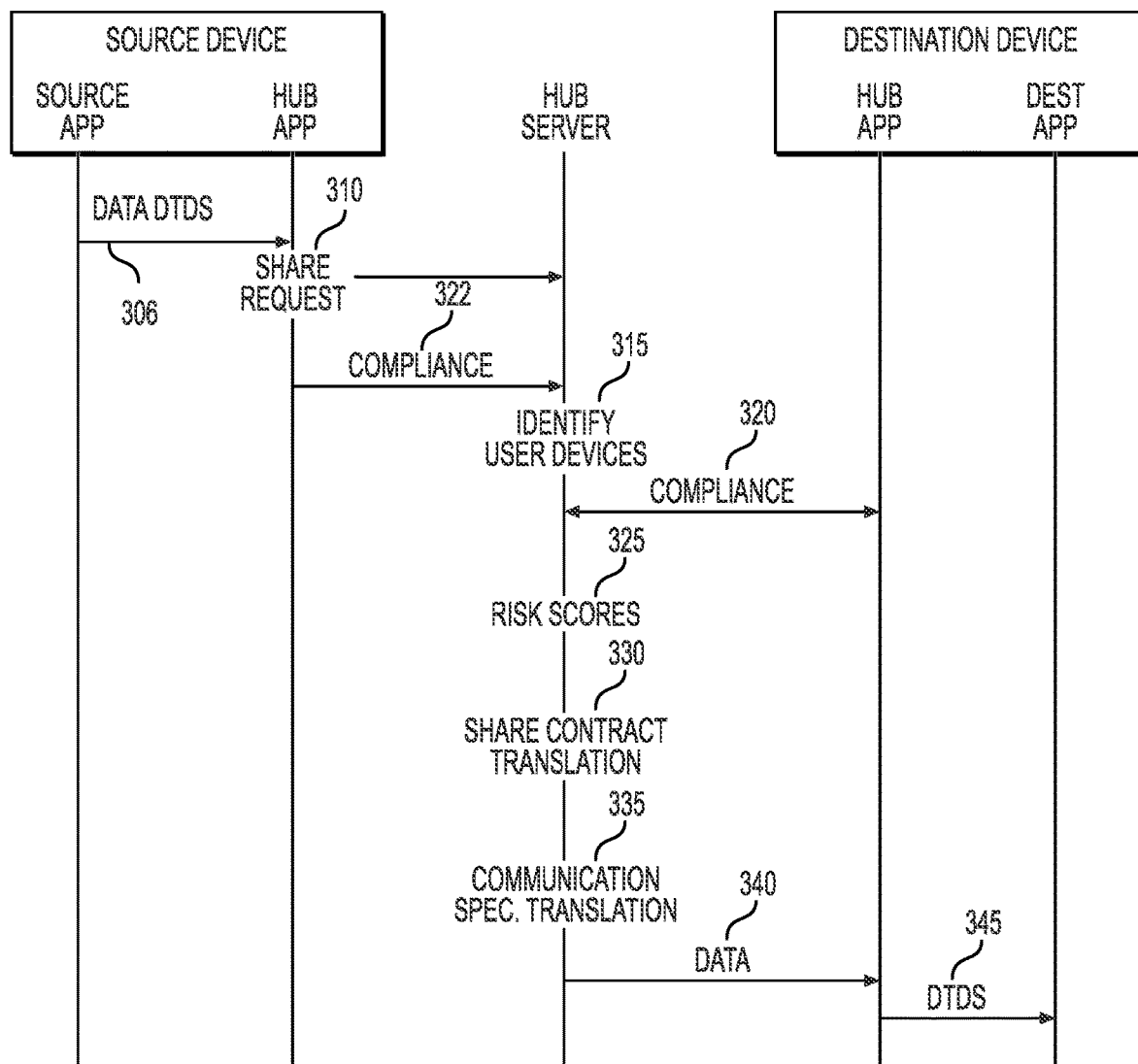
FIG. 3 is a sequence diagram of an example method for secure cross-device DTDS.

FIG. 3 is a sequence diagram of an example method for secure cross-device DTDS. At stage 306, the source application 112 can detect data 114 eligible to share on another user device. The detection can be based on an SDK that operates with the source application, in an example. The SDK can allow the hub server 120 to specify which types of information should be shared, in an example. Alternatively, the SDK can receive that information from an agent on the device 110, such as the hub application 116. In another example, the user can select to share data, such as by selecting a sharing option after choosing an image, map location, URL, or text. The source application 112 can share the data 114 with the hub application 116 using DTDS as defined in the share contract for the OS of the first device 110.

At stage 310, the hub application 116 can encrypt the data 114 and send it to the hub server 120 as part of a copy or share request. The data 114 can be sent over a network, such as the internet. The hub application 116 (or some other agent) can also send compliance status information at stage 322. The compliance status information can be sent in response to a request from the hub server 120 in an example. Alternatively, the compliance status information can be sent with the copy request at stage 310, in an example.

At stage 315, the hub server 120 can identify other user devices that are associated with the same user as the source device 110. This can include looking up the user of the source device 110 based on the device ID or authentication information received with the copy request. In this example, a destination device 130 can be identified as another user device associated with the same user. The destination device 130 can also be set to receive transient data 114 in an example.

At stage 320, the hub server 120 can request and receive compliance status information from the hub application 132 (or other agent) of the destination device 130. Using the compliance data, at stage 325 the hub server 120 can determine risk scores for the source and destination devices 110, 130. The compliance statuses themselves can be scores in one example. In another example, the current state of each device can be used as inputs to a scoring model or algorithm that outputs a risk score. The risk scores can be compared against one or more safety thresholds in an example. In one example, if one or both devices 110, 130 have risk scores that fall below the safety threshold, then the hub server 120 can decline to share the data with the destination device 130. In another example, a threshold difference in risk scores between the devices 110, 130 can cause the hub server 120 to deny sharing the data 114.

At stage 330, the hub server 120 can perform share contract adaptation based on the destination device 130 running a different OS than the source device 110. The server 120 can compare the OS of each device 110, 130 to determine that a difference in OS exists. The share contract adaptation can include content specification adaptation and communication specification adaptation, in an example. The content specification of the OS can define the data formats for transient data 114 that the OS supports. Example transient data types and different support examples are shown below in Table 1.

TABLE 1

Transient Data Formats Supported by OS APIs

| OS/Data Format | Text (text/ plain) | HTML (text/ html) | URL (text/ uri-list) | RTF (text/ rtf) | Image (image/*) | Video (video/*) |
|---|---|---|---|---|---|---|
| ANDROID | Full | Full | No | Full | Full | Full |
| iOS | Full | Full | Full | No | Full | Full |
| WINDOWS | Full | Full | Full | Full | Partial | No |

Each OS can provide an API to specify the transient data 114 it supports. In Table 1, WINDOWS can be a universal WINDOWS platform ("UWP") enabled version of WINDOWS. File and custom data formats can be ignored since transient data 114 can be the focus of DTDS sharing, rather than files, in an example. Custom transient data formats can be application and OS specific. Therefore, custom transient data formats may only be sharable when the same custom transient data format is supported by two operating systems or the two devices 110, 130 run the same OS.

In Table 1, "Full" means that the OS has an API to fully support the target data format. When both the source and target OS have "Full" support for a target data format, data format conversion (as part of content specification adaptation) can be avoided. For example, plain text (text/plain) is supported by all three OS types in Table 1. As a result, transient data 114 that is plain text can be directly shared between devices having any of the OS types without conversion, in an example. The same applies for HTML in this example. However, Table 1 indicates that URLs (text/uri-list) can be shared between iOS and WINDOWS devices without conversion, but not with ANDROID. ANDROID and iOS devices can share images and videos without conversion also.

In Table 1, "No" means that the OS has no API support for a target data format with regard to direct sharing with DTDS. Instead, the server 120 can attempt to convert to a different target data format that is supported by the OS API. If no conversion is possible, the server can decline to share the data 114. As an example, if a URL is being sent to a destination device 130 running ANDROID, the server 120 can convert the URL to HTML. Similarly, when a WINDOWS application shares RTF data with an iOS application, the server 120 can convert the RTF data into plain text. However, because video has no adjacent data format, an ANDROID device cannot share video data with a WINDOWS device in this example.

In Table 1, "Partial" means that the OS only supports a subset of the target data format. In this example, WINDOWS only provides APIs that support a bitmap type of image (image/bmp). When and ANDROID or iOS device shares a different type of image (e.g., PNG or JPEG) with a WINDOWS device, the server 120 can convert the image to bitmap format.

In one example, the server 120 can provide data format conversions even when "Full" support exists for source and destination OS types. Media (image and video) or text subtypes can be converted to a more favorable subtype for the destination OS in an example. For example, QUICKTIME videos operate well with the iOS OS and RTF is a favorable file type for WINDOWS. Therefore, the server can convert a supported video type to QUICKTIME or a supported text to RTF, in an example. When performing data format conversions, the server 120 can use an intelligent mode or manual mode, in an example. In intelligent mode, the hub service can automatically choose an output data format for an input data format based on a user's behavior history and other users' behavior history. For example, data types commonly used on a destination device 130 or OS type can be preferred and drive intelligent conversions. In manual mode, the user can manually select the output format from a candidate list. For example, the user can set preferences that determine preferred data formats for different data types. The preferences can be stored at the server 120. Alternatively, they can be locally stored on the source device 110 or destination device 130 and accessed by the local agent, which can communicate the preference to the server 120. In still another example, the local agent can cause a local conversion to occur on the destination device 130 based on the preferences. In that case, the agent can perform the conversion in an example.

To prevent denial-of-service ("DoS") attacks and maintain user experience, the server 120 can also limit the size of transient data 114 that can be shared across devices. The limit can be configured by an administrator, in an example.

The share contract translation can also include communication specification translation at stage 335, in an example. For local DTDS, the OS can require transferring data 114 to a destination application at stage 345 in a mostly asynchronous way. However, the transmissions between agents and the hub server 120 at stages 310 and 340 can be synchronous. For example, a destination device 130 may not be notified of the availability of target transient data until the hub service receives all of the transient data from the source device 110. This can ensure quality of service ("QoS") and remove complexities of handling data over unstable network connections.

ANDROID and iOS can support transferring multiple transient data items in one sharing operation. For example, in one DTDS operation, the agent can send multiple images to the destination application at stage 345. However, WINDOWS can allow sharing only one single transient data item at a time. To accommodate this, when sharing multiple transient data items from ANDROID or iOS to a WINDOWS device, the hub application 116 or 132 can create a share button for each transient data item 114. The user can select each item 114 one at a time to share the data items one by one.

At stage 340, the converted data can be sent to the agent on the destination device 130. The agent can decrypt the data and share it with the destination application using local DTDS at stage 345. This can cause the transient data to exist within the destination application. When the user then switches to the destination device, the transient data will be available at the destination application.

Figure 4:
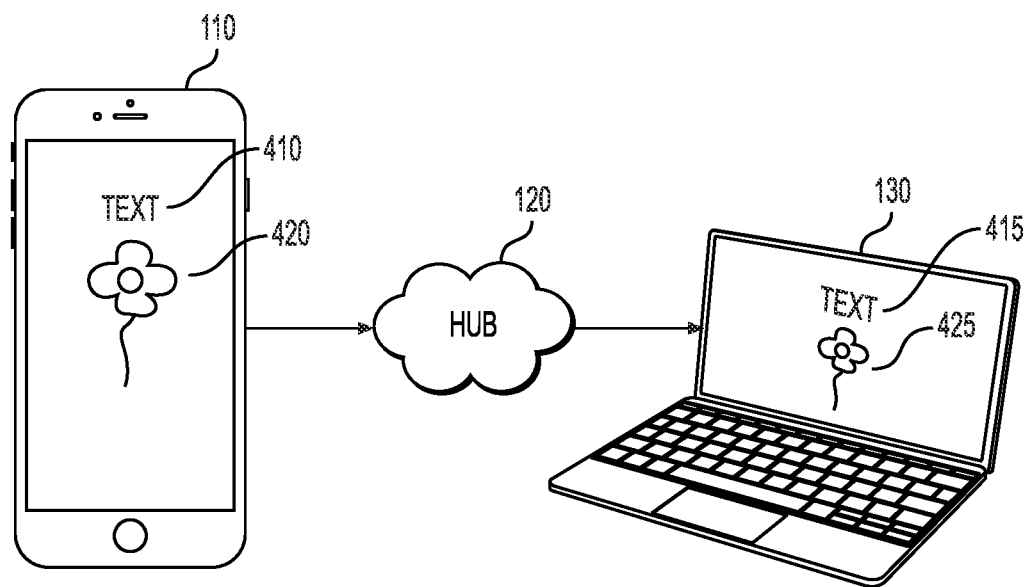
FIG. 4 is an example illustration showing data transferred between devices using secure cross-device DTDS.

FIG. 4 is an example illustration showing data transferred between devices using secure cross-device DTDS. In this example, the source device 110 is an APPLE phone. The user can select transient data 410 to share with the user's other devices, such as destination device 130. In this example, the destination device 130 can be a WINDOWS laptop. The text selected can be automatically shared or the hub application 112 can present sharing options, such as allowing the user to specify which device or all devices to share with. The hub application 112 can be informed of the existence of the user's other devices from the hub server 120, in an example.

When the sharing occurs automatically or at the user's manual input, the hub server 120 can receive the transient text data 410. The hub server 120 can compare risk scores from both devices 110, 130 and determine that a safety threshold is met. If so, sharing can go forward. Based on historical WINDOWS usage or the user's preset preferences, the hub server 120 can then translate the text into RTF. Even though text is a compatible data type for WINDOWS, the translation to RTF can be a preferred WINDOWS format.

In another example, the user can select to share transient data and be presented with options to share both the text data 410 and image data 420. Because the destination device 130 runs WINDOWS, in one example the sharing can be limited to sequential one-by-one data items. The user can select to share the image data 420. Once that sharing is complete, the text data 410 can be shared.

The user can open a destination application, such as a browser, on the destination device 130. The shared text item 415 and shared image item 425 can appear in the destination application. The source and destination applications need not be the same.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for sharing between user devices using direct transient data sharing ("DTDS"), comprising:
   receiving data at a server from a first device, wherein a source application on the first device shares the data with a first agent at the first device using DTDS, and wherein the first agent shares the data with the sever;
   identifying, at the server, a second device associated with a same user as the first device;
   determining that security requirements are met by at least one of the first device and second device; and
   in an instance where the security requirements are met, sending the data to a destination application of the second device,
   wherein determining the security requirements are met includes determining risk scores for the first device and second device based on a management status of the source application and destination application, wherein the risk scores are compared against a threshold to determine whether to send the data to the destination application.

2. The method of claim 1, further comprising:
   determining that the second device runs a different operating system ("OS") compared to the first device; and
   translating the data for use with the different OS.

3. The method of claim 2, wherein the translating includes the server converting an image to a different image format.

4. The method of claim 2, wherein the translating includes converting the data to a different size.

5. The method of claim 1, wherein determining the security requirements are met is based on compliance of the first and second devices with an enterprise mobility management ("EMM") compliance policy, wherein a first agent on the first and a second agent on the second device report compliance statuses to the server.

6. The method of claim 1, wherein sending the data to the destination application includes sending the data from the server to a second agent on the second device, and wherein the second agent sends the data to the destination application using DTDS.

7. A non-transitory, computer-readable medium containing instructions that, when executed by a hardware-based processor, performs stages for sharing between user devices using direct transient data sharing ("DTDS"), the stages comprising:

receiving data at a server from a first device, wherein a source application on the first device shares the data with a first agent at the first device using DTDS, and wherein the first agent shares the data with the sever;

identifying, at the server, a second device associated with a same user as the first device;

determining that security requirements are met by at least one of the first device and second device;

in an instance where the security requirements are met, sending the data to a destination application of the second device;

determining that the second device runs a different operating system ("OS") compared to the first device; and translating the data for use with the different OS.

8. The non-transitory, computer-readable medium of claim 7, wherein the translating includes the server converting an image to a different image format.

9. The non-transitory, computer-readable medium of claim 7, wherein the translating includes converting the data to a different size.

10. The non-transitory, computer-readable medium of claim 7, wherein determining the security requirements are met includes determining risk scores for the first device and second device based on a management status of the source application and destination application, wherein the risk scores are compared against a threshold to determine whether to send the data to the destination application.

11. The non-transitory, computer-readable medium of claim 7, wherein determining the security requirements are met is based on compliance of the first and second devices with an enterprise mobility management ("EMM") compliance policy, wherein a first agent on the first and a second agent on the second device report compliance statuses to the server.

12. The non-transitory, computer-readable medium of claim 7, wherein sending the data to the destination application includes sending the data from the server to a second agent on the second device, and wherein the second agent sends the data to the destination application using DTDS.

13. A system for secure cross-device transient data sharing using direct transient data sharing ("DTDS"), comprising:

a memory storage including a non-transitory, computer-readable medium comprising instructions; and a computing device including a hardware-based processor that executes the instructions to carry out stages comprising:

receiving data at a server from a first device, wherein a source application on the first device shares the data with a first agent at the first device using DTDS, and wherein the first agent shares the data with the sever;

identifying, at the server, a second device associated with a same user as the first device;

determining that security requirements are met by at least one of the first device and second device; and in an instance where the security requirements are met, sending the data to a destination application of the second device.

14. The system of claim 13, the stages further comprising: determining that the second device runs a different operating system ("OS") compared to the first device; and translating the data for use with the different OS.

15. The system of claim 14, wherein the translating includes the server converting an image to a different image format.

16. The system of claim 14, wherein the translating includes converting the data to a different size.

17. The system of claim 13, wherein determining the security requirements are met includes determining risk scores for the first device and second device based on a management status of the source application and destination application, wherein the risk scores are compared against a threshold to determine whether to send the data to the destination application.

18. The system of claim 13, wherein determining the security requirements are met is based on compliance of the first and second devices with an enterprise mobility management ("EMM") compliance policy, wherein a first agent on the first and a second agent on the second device report compliance statuses to the server.

* * * * *